United States Patent
Raravi et al.

(10) Patent No.: US 9,154,996 B2
(45) Date of Patent: Oct. 6, 2015

(54) APPARATUS AND METHOD FOR MAINTAINING RELIABILITY OF WIRELESS NETWORK HAVING ASYMMETRIC OR OTHER LOW QUALITY WIRELESS LINKS

(71) Applicant: Honeywell International, Inc., Morristown, NJ (US)

(72) Inventors: Channabasavaraj Raravi, Hospet (IN); Prasad Samudrala, Bangalore (IN); Norman R. Swanson, Douglassville, PA (US); Christopher Pulini, Ambler, PA (US)

(73) Assignee: Honeywell International Inc., Morristown, NJ (US)

( * ) Notice: Subject to any disclaimer, the term of this patent is extended or adjusted under 35 U.S.C. 154(b) by 175 days.

(21) Appl. No.: 13/953,420

(22) Filed: Jul. 29, 2013

(65) Prior Publication Data
US 2014/0369212 A1    Dec. 18, 2014

Related U.S. Application Data

(60) Provisional application No. 61/834,015, filed on Jun. 12, 2013.

(51) Int. Cl.
*H04W 28/12* (2009.01)
*H04W 24/10* (2009.01)
(Continued)

(52) U.S. Cl.
CPC .............. *H04W 28/12* (2013.01); *H04W 24/10* (2013.01); *H04W 40/246* (2013.01); *H04W 40/24* (2013.01); *H04W 84/18* (2013.01)

(58) Field of Classification Search
None
See application file for complete search history.

(56) References Cited

U.S. PATENT DOCUMENTS

| 4,688,224 A | 8/1987 | Dal Degan et al. |
| 5,293,639 A | 3/1994 | Wilson et al. |
| 6,522,881 B1 | 2/2003 | Feder et al. |

(Continued)

FOREIGN PATENT DOCUMENTS

| EP | 2018007 A1 | 1/2009 |
| WO | WO 2006/021791 A1 | 3/2006 |
| WO | WO 2006/122287 A2 | 11/2006 |

OTHER PUBLICATIONS

Extended European Search Report dated Nov. 25, 2014 in connection with European Patent Application No. 14169550.2; 7 pages.

(Continued)

*Primary Examiner* — Habte Mered

(57) ABSTRACT

A method includes receiving link quality information associated with multiple wireless connections in a wireless network. The method also includes identifying at least one asymmetric communication path in the wireless network using the link quality information. The link quality information could include a statistical value for each of the wireless connections. Identifying the at least one asymmetric communication path could include identifying a first and a second of the statistical values associated with a first and a second of the wireless connections, respectively, and determining whether a difference between the first and second statistical values exceeds a threshold. The method could further include applying a heuristic to indicate that the first and second wireless connections do not form an asymmetric communication path even if the difference between the first and second statistical values exceeds the threshold.

20 Claims, 8 Drawing Sheets

(51) Int. Cl.
*H04W 40/24* (2009.01)
*H04W 84/18* (2009.01)

(56) References Cited

U.S. PATENT DOCUMENTS

| | | |
|---|---|---|
| 8,396,007 B2 | 3/2013 | Gonia et al. |
| 2002/0081977 A1 | 6/2002 | McCune, Jr. |
| 2003/0040319 A1 | 2/2003 | Hansen et al. |
| 2003/0139136 A1 | 7/2003 | Pattabiraman |
| 2004/0203459 A1 | 10/2004 | Borras-Chia et al. |
| 2005/0030905 A1 | 2/2005 | Luo et al. |
| 2005/0068970 A1* | 3/2005 | Srikrishna et al. ............ 370/400 |
| 2006/0020697 A1 | 1/2006 | Kelso et al. |
| 2006/0040707 A1 | 2/2006 | Kish et al. |
| 2006/0268879 A1 | 11/2006 | Xhafa et al. |
| 2007/0179721 A1* | 8/2007 | Yaney ............................. 702/59 |
| 2007/0225013 A1 | 9/2007 | Pflum et al. |
| 2007/0291660 A1 | 12/2007 | Robson et al. |
| 2008/0205290 A1* | 8/2008 | Wille et al. ................... 370/252 |
| 2008/0205292 A1* | 8/2008 | Denby et al. ................. 370/254 |
| 2008/0205420 A1 | 8/2008 | Srikrishna et al. |
| 2009/0022061 A1 | 1/2009 | Walley et al. |
| 2009/0073893 A1 | 3/2009 | Vu Duong et al. |
| 2009/0132862 A1 | 5/2009 | Martin et al. |
| 2009/0185492 A1 | 7/2009 | Senarath et al. |
| 2009/0213771 A1* | 8/2009 | Celentano et al. ............ 370/310 |
| 2010/0031110 A1 | 2/2010 | Seok et al. |
| 2010/0074141 A1* | 3/2010 | Nguyen ....................... 370/254 |
| 2010/0278103 A1 | 11/2010 | Park et al. |
| 2010/0304738 A1* | 12/2010 | Lim ........................... 455/426.1 |
| 2011/0119401 A1 | 5/2011 | Kish et al. |
| 2011/0122842 A1 | 5/2011 | Kim |
| 2012/0058769 A1 | 3/2012 | Tomita et al. |
| 2012/0113859 A1 | 5/2012 | Jung et al. |
| 2012/0155299 A1 | 6/2012 | Reams |
| 2012/0163192 A1 | 6/2012 | Bae |
| 2013/0010601 A1 | 1/2013 | Senarath et al. |
| 2013/0038502 A1 | 2/2013 | Erdem |
| 2013/0250786 A1 | 9/2013 | Balasaygun et al. |
| 2013/0308592 A1 | 11/2013 | Kitou et al. |
| 2014/0033342 A1 | 1/2014 | Gutterson et al. |
| 2014/0126397 A1 | 5/2014 | Hansen et al. |
| 2014/0226547 A1 | 8/2014 | Zainaldin |

OTHER PUBLICATIONS

Non-Final Office Action dated Jan. 14, 2015 in connection with U.S. Appl. No. 13/948,077; 24 pages.
Bin Bin Chen, et al., "DEAL: Discover and Exploit Asymmetric Links in Dense Wireless Sensor Networks", IEEE, Jun. 22, 2009, 9 pages.
Alexander Klein, et al., "Performance Study of the Better Approach to Mobile Adhoc Networking (B.A.T.M.A.N.) Protocol in the Context of Asymmetric Links", IEEE, Jun. 25, 2012, 7 pages.
Mark D. Yarvis, et al., "Real-World Experiences with an Interactive Ad Hoc Sensor Network", IEEE, Aug. 18, 2002, 9 pages.
European Search Report dated Aug. 5, 2014 in connection with European Patent Application No. EP 14 17 0399.
U.S. Office Action dated Jun. 12, 2015 in connection with U.S. Appl. No. 13/948,077; 22 pages.

* cited by examiner

APPARATUS AND METHOD FOR MAINTAINING RELIABILITY OF WIRELESS NETWORK HAVING ASYMMETRIC OR OTHER LOW QUALITY WIRELESS LINKS

CROSS-REFERENCE TO RELATED APPLICATION AND PRIORITY CLAIM

This application claims priority under 35 U.S.C. §119(e) to U.S. Provisional Patent Application No. 61/834,015 filed on Jun. 12, 2013, which is hereby incorporated by reference in its entirety.

TECHNICAL FIELD

This disclosure relates generally to wireless communication systems. More specifically, this disclosure relates to an apparatus and method for maintaining the reliability of a wireless network having asymmetric or other low quality wireless links.

BACKGROUND

Wireless networks are frequently used in industrial process control systems. For example, a process control system often includes sensors that provide measurements over a wireless network and actuators that receive control signals over the wireless network. A process controller can use the measurements from the sensors to generate the control signals for the actuators.

When two nodes in a wireless network are operating at the same power level and have antennas with equal gains, the link qualities in both directions between the nodes are ideally the same. An asymmetric link in a wireless network occurs when a wireless node's uplink and downlink communication qualities are different. An asymmetric link can be formed in various ways, such as due to nodes transmitting at different power levels or environmental factors (like different multi-path reflections). The reliability of a wireless network, such as a mesh network, can degrade severely in the presence of asymmetric links.

SUMMARY

This disclosure provides an apparatus and method for maintaining the reliability of a wireless network having asymmetric or other low quality wireless links.

In a first embodiment, a method includes receiving link quality information associated with multiple wireless connections in a wireless network. The method also includes identifying at least one asymmetric communication path in the wireless network using the link quality information.

In a second embodiment, an apparatus includes an interface configured to receive link quality information associated with multiple wireless connections in a wireless network. The apparatus also includes at least one processing device configured to identify at least one asymmetric communication path in the wireless network using the link quality information.

In a third embodiment, a non-transitory computer readable medium embodies a computer program. The computer program includes computer readable program code for obtaining link quality information associated with multiple wireless connections in a wireless network. The computer program also includes computer readable program code for identifying at least one asymmetric communication path in the wireless network using the link quality information.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 7, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
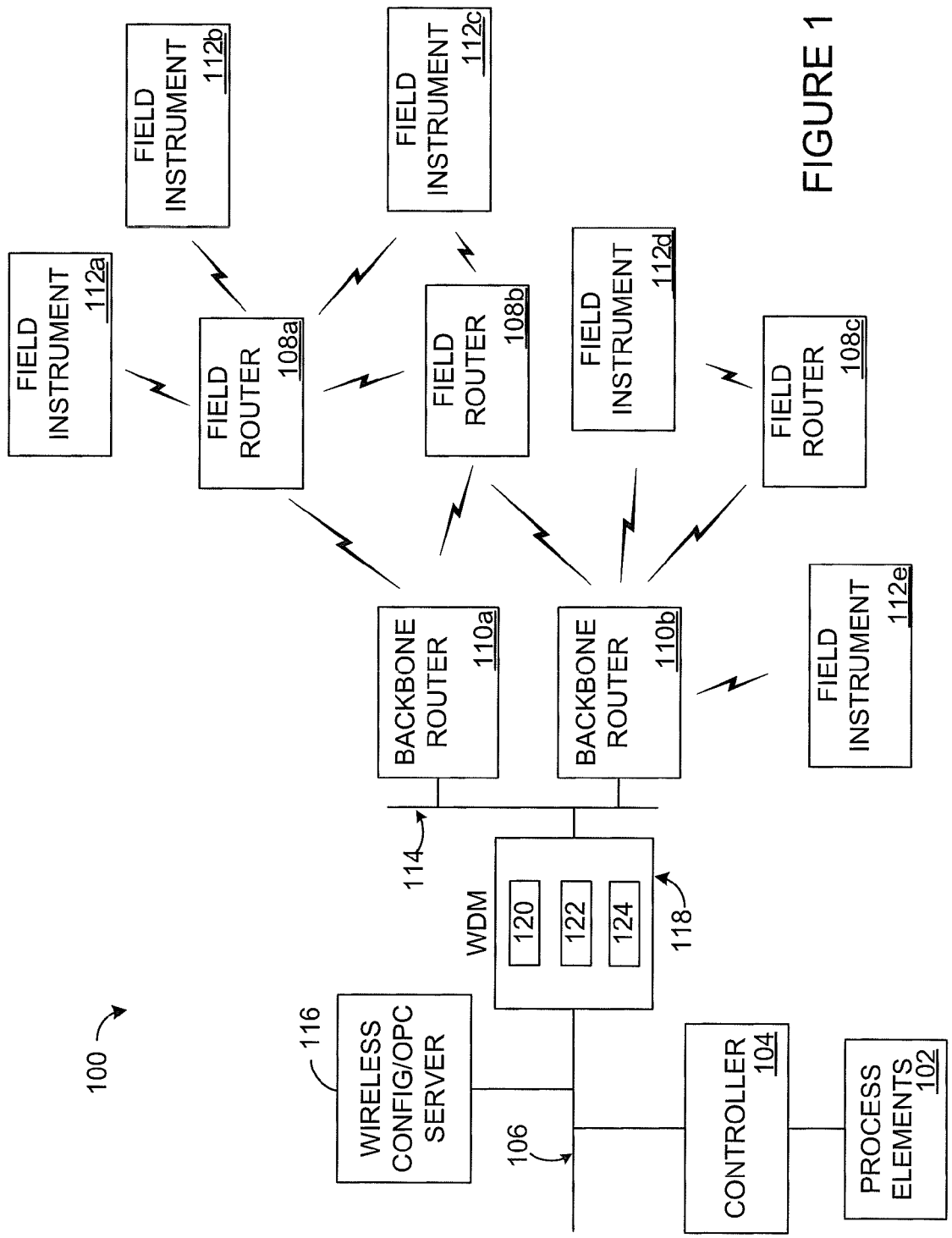
FIG. 1 illustrates an example industrial control and automation system according to this disclosure.

FIG. 1 illustrates an example industrial control and automation system 100 according to this disclosure. As shown in FIG. 1, the system 100 includes one or more process elements 102. The process elements 102 represent components in a process system that perform any of a wide variety of functions. For example, the process elements 102 could represent sensors, actuators, or any other or additional industrial equipment in a processing environment. Each process element 102 includes any suitable structure for performing one or more functions in a process system. Also, a process system represents any system or portion thereof configured to process one or more materials in some manner.

A controller 104 is coupled to the process elements 102. The controller 104 controls the operation of one or more of the process elements 102. For example, the controller 104 could receive information associated with the process system, such as sensor measurements from some of the process elements 102. The controller 104 could use this information to generate control signals for others of the process elements 102 such as actuators, thereby adjusting the operation of those process elements 102. The controller 104 includes any suitable structure for controlling one or more process elements 102. The controller 104 could, for example, represent a computing device executing a MICROSOFT WINDOWS or suitable real-time operating system.

A network 106 facilitates communication between various components in the system 100. For example, the network 106 may communicate Internet Protocol (IP) packets, frame relay frames, Asynchronous Transfer Mode (ATM) cells, or other suitable information between network addresses. The network 106 may include one or more local area networks, metropolitan area networks, wide area networks, all or a portion of a global network, or any other communication system(s) at one or more locations. As a particular example, the network 106 could include a FAULT TOLERANT ETHERNET network from HONEYWELL INTERNATIONAL INC.

The system 100 also includes one or more industrial wireless networks for communicating with wireless sensors or other wireless field devices. In the example shown in FIG. 1, an industrial wireless network includes field routers 108a-108c and backbone routers 110a-110b. The field routers 108a-108c and backbone routers 110a-110b wirelessly communicate with each other to form a wireless network, such as a mesh network. For example, the field routers 108a-108c could receive data transmitted wirelessly from field instruments 112a-112e and route the data to the backbone routers 110a-110b. The backbone routers 110a-110b could receive data from the field routers 108a-108c directly or indirectly (such as through other field routers) and directly or indirectly from the field instruments 112a-112e for transmission over a backbone network 114. The field routers 108a-108c and backbone routers 110a-110b could also route data received over the backbone network 114 to the field instruments 112a-112e. In this way, the field routers 108a-108c and backbone routers 110a-110b form a network that can provide wireless coverage to field instruments and other devices in a specified area, such as a large industrial complex. The wireless network can support any suitable industrial wireless network protocol(s), such as ISA100 Wireless or WirelessHART.

In this example, the field routers 108a-108c and backbone routers 110a-110b generally represent routing devices that store and forward messages for other devices. Field routers 108a-108c may be battery-powered or otherwise locally powered, and backbone routers 110a-110b may be line-powered or receive operating power from external sources (such as AC supply lines). However, each field or backbone router could be powered in any suitable manner. The field instruments 112a-112e generally represent non-routing devices that are routinely locally-powered, although a field instrument could provide routing functionality or be line-powered.

Each field router 108a-108c and backbone router 110a-110b includes any suitable structure facilitating wireless communications, such as a radio frequency (RF) frequency-hopping spread spectrum (FHSS) or direct sequence spread spectrum (DSSS) transceiver. Each of the backbone routers 110a-110b also includes any suitable structure facilitating communication over the backbone network 114, such as an Ethernet transceiver. In particular embodiments, the field routers 108a-108c could represent field device access points (FDAPs) that are not connected via wired Ethernet and may be locally powered, and the backbone routers 110a-110b could represent FDAPs that are connected via wired Ethernet and may be line powered. The backbone network 114 includes any suitable network for transporting data, such as a FAULT TOLERANT ETHERNET network, a wireless mesh network, or other wired or wireless network.

A wireless configuration and OLE for Process Control (OPC) server 116 can configure and control various aspects of the system 100 via a wireless device manager (WDM) 118. For example, the server 116 allows for the control of process elements 102 via the controller 104 and via the WDM 118, which configures the operation of the field routers 108a-108c, backbone routers 110a-110b, and field instruments 112a-112e. The server 116 could also support security in the system 100, such as by allowing for the WDM 118 to distribute cryptographic keys or other security data to various wireless devices or other components. The server 116 includes any suitable structure for operating industrial control and automation system 100.

The WDM 118 supports various functional components used to manage and interact with a wireless network. For example, the WDM 118 can include a gateway 120, a security manager 122, and a system manager 124. The gateway 120 performs various translation functions, allowing information to be exchanged between networks using different protocols. For instance, the gateway 120 could translate between one or more wired Ethernet protocols and one or more wireless protocols. The security manager 122 performs various security-related functions, such as functions to allow only authorized traffic to flow between the networks 106, 114. The system manager 124 performs various management functions to manage a wireless network. For example, the system manager 124 could collect information and identify asymmetric or other low quality links in a wireless network. The system manager 124 can also be responsible for choosing communication paths for each device and managing any resources needed to communicate over the wireless network (such as by allocating communication slots and coordinating slot allocations between different devices).

Each functional component 120-124 in the WDM 118 could be implemented in any suitable manner. For example, each functional component 120-124 could be implemented using hardware or a combination of hardware and software/firmware instructions. Also, hardware can be shared between the functional components 120-124, such as when the same processing devices are used to execute instructions of the functional components 120-124. While shown as forming part of a single WDM 118, one or more functional components 120-124 could be implemented as separate components.

In particular embodiments, various devices in the wireless network of FIG. 1 form a mesh network communicating at 2.4 GHz or 5.8 GHz. Also, in particular embodiments, data can be injected into the wireless mesh network through the routers or field instruments, thus providing versatile, multifunctional, plant-wide coverage for wireless sensing, asset location tracking, personnel tracking, wireless communications, and any other or additional functionality as desired.

In one aspect of operation, the system 100 supports a mechanism for making a wireless network more reliable. For example, asymmetric or other low quality links can be identified and then considered by a network management algorithm to make a wireless network more reliable. The network management algorithm can receive data identifying the link qualities in the wireless network and identify multiple link qualities between a single pair of wireless nodes (such as one link quality in each direction). This data could be presented to an operator, used to automatically or manually reconfigure the wireless network, or used in any other suitable manner. The network management algorithm could represent or be performed by any suitable component(s) in the system 100, such as the system manager 124. Additional details and functions of the network management algorithm are described below.

Although FIG. 1 illustrates one example of an industrial control and automation system 100, various changes may be made to FIG. 1. For example, the system 100 could include any number of each component. Also, the functional division shown in FIG. 1 is for illustration only. Various components in FIG. 1 could be combined, subdivided, or omitted and additional components could be added according to particular needs. Further, while the wireless network is illustrated as being used along with a wired controller 104 and wired process elements 102, one or more wireless networks could be used in a system without wired control elements. In addition, FIG. 1 illustrates one example operational environment where the identification of asymmetric or other low quality links can be performed. This functionality could be used in any other suitable system.

Figure 2:
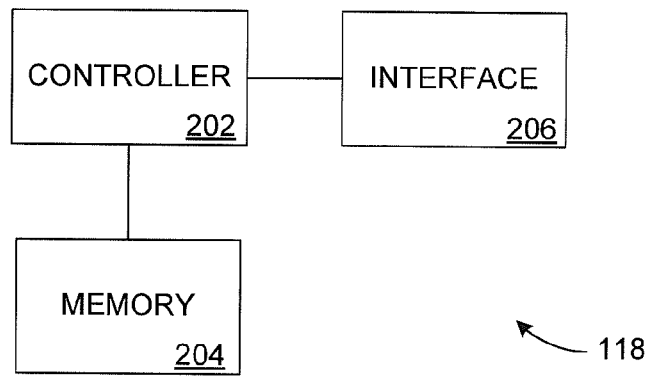
FIG. 2 illustrates an example wireless device manager or other device executing a network management algorithm in an industrial control and automation system according to this disclosure.

FIG. 2 illustrates an example wireless device manager (WDM) 118 or other device executing a network management algorithm in an industrial control and automation system according to this disclosure. As noted above, the network management algorithm could represent or form at least a part of the system manager 124.

As shown in FIG. 2, the device includes a controller 202, which controls the overall operation of the device. For example, the controller 202 may identify link qualities of links in a wireless network and identify asymmetric and other low quality links. The controller 202 can also generate graphical displays identifying asymmetric and other low quality links in the wireless network. The controller 202 can use the identity of an asymmetric or other low quality link in any other suitable manner. The controller 202 includes any suitable structure for controlling operation of a device. As particular examples, the controller 202 could represent at least one processor, microprocessor, microcontroller, field programmable gate array, digital signal processor, or other processing or control device.

A memory 204 is coupled to the controller 202. The memory 204 stores any of a wide variety of information used, collected, or generated by the device. For example, the memory 204 could store link quality information generated or received by the device. The memory 204 includes any suitable volatile and/or non-volatile storage and retrieval device(s).

The device also includes one or more interfaces 206 configured to communicate with external devices and systems. For example, the interfaces 206 could include one or more Ethernet or other wired network interfaces supporting communications over one or more wired networks (such as the networks 106, 114). The interfaces 206 could also include one or more RF or other wireless network interfaces supporting communications over one or more wireless networks. The interface(s) 206 can be used in any suitable manner, such as to receive information identifying link qualities in a wireless network and transmit information associated with identified asymmetric or other low quality wireless links. Each interface 206 includes any suitable structure for transmitting and/or receiving signals over a network.

Asymmetric or other low quality links in a wireless network can be identified in any suitable manner. For example, quality statistics could be identified for two unidirectional connections forming a single communication path between device A and device B. The quality statistics could represent any suitable values, such as Received Signal Quality Indicator (RSQI), Received Signal Strength Indication (RSSI), or transmit success/fail ratio values. The network management algorithm can identify significant differences between the quality statistics of the A-to-B and B-to-A connections. If the difference between a quality statistic of the two connections is too high (such as greater than a threshold percentage or amount), the communication path can be treated as asymmetric. As a particular example, if the RSQI value for the A-to-B connection is less than the RSQI value for the B-to-A connection by a certain percentage or amount, the communication path can be treated as asymmetric.

Each threshold could represent a constant or variable threshold, and each threshold can be established in any suitable manner (such as by the system or by a user). Various heuristics could also be used, such as to define requirements to be met before a communication path is viewed as being asymmetric. For instance, a heuristic might indicate that a communication path is not to be treated as asymmetric if a differential in the statistics for two unidirectional connections exceeds the threshold but the statistics are greater than a second threshold (such as when RSQI values in both directions exceed a value of 200 or other value). In that case, there may be no need to take any corrective action since both unidirectional connections in the communication path have high quality.

Once an asymmetric or other low quality link has been identified, this information can be used in any suitable manner. For example, the system manager 124 could automatically reconfigure the wireless network to avoid using an asymmetric link. Also, the system could present data to a user and allow the user to manually reconfigure the wireless network. The system could further log the information and present the information as part of historical data to a user, such as via a report. In addition, the system manager 124 could prevent activation of a newly-formed wireless connection, such as before sufficient data has been collected to determine whether the newly-formed connection is asymmetric, based upon historical data. This may allow, for instance, the system manager 124 to block or delay the use of a newly-formed wireless connection if a similar wireless connection did not work previously.

Although FIG. 2 illustrates one example of a WDM 118 or other device executing a network management algorithm in an industrial control and automation system, various changes may be made to FIG. 2. For example, various components in FIG. 2 could be combined, subdivided, or omitted and additional components could be added according to particular needs.

Figure 4:
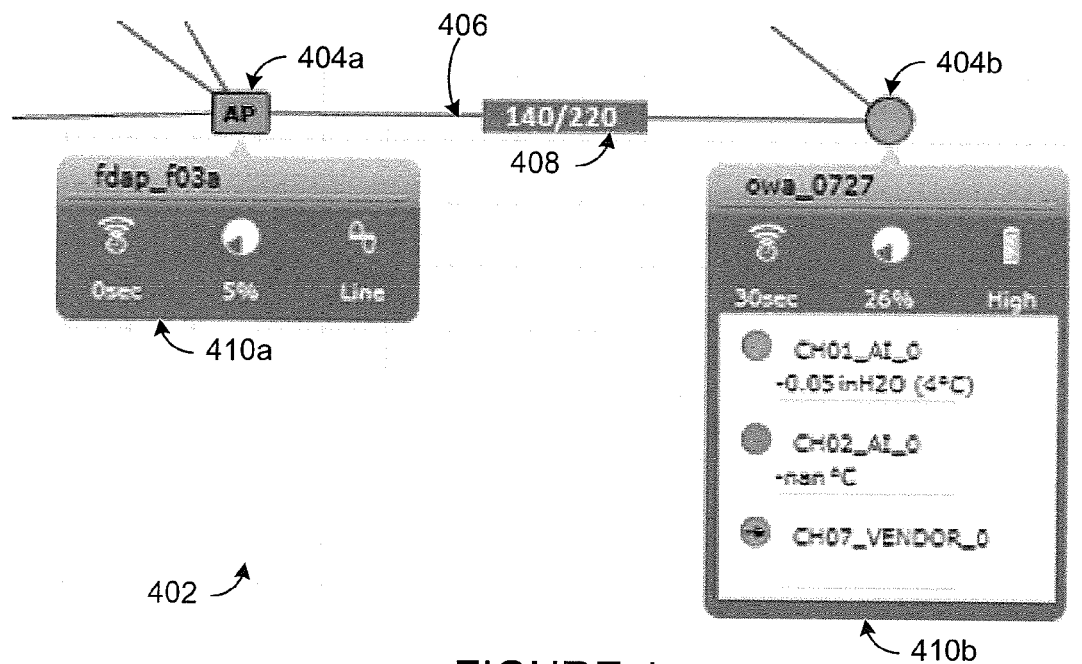
FIGS. 3 and 4 illustrate an example graphical display for reporting the reliability of a wireless network according to this disclosure.
Figure 3:
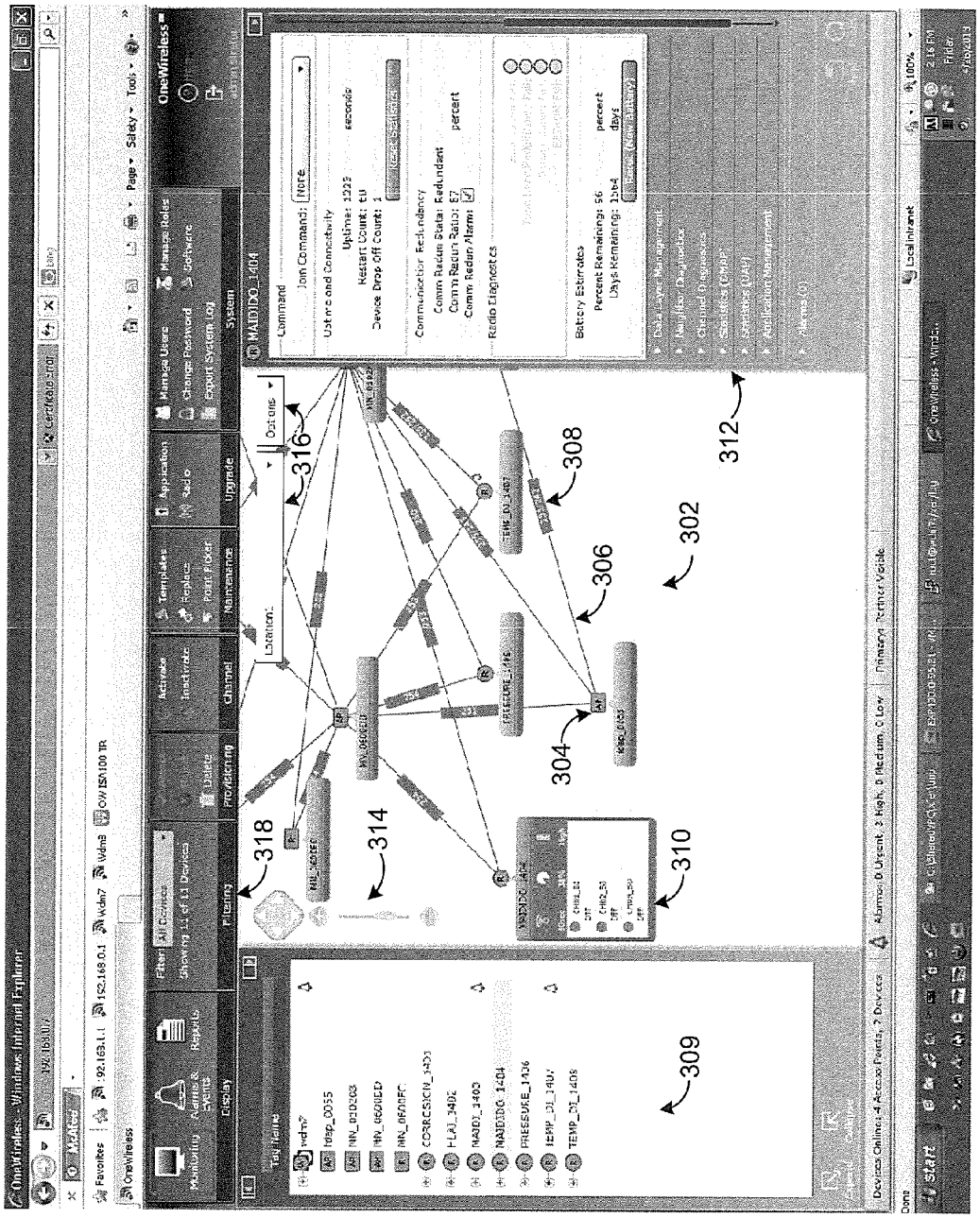

FIGS. 3 and 4 illustrate an example graphical display 300 for reporting the reliability of a wireless network according to this disclosure. The graphical display 300 represents one example way in which asymmetric or other low quality links can be identified and used. The graphical display 300 could be generated by any suitable device or system (such as the system manager 124) and presented on any suitable device or system (such as a control room display screen).

As shown in FIG. 3, the graphical display 300 includes a network map 302, which identifies nodes of a wireless network and communication paths between those nodes. In this example, the network map 302 includes various icons 304 representing the network nodes and various lines 306 representing the communication paths between those nodes. Note that this represents one example of a network map 302 and that the network map 302 can include any number of nodes and any number of communication paths in any suitable arrangement.

Each line 306 representing a communication path can include a label 308. Each label 308 in this example includes one or more statistical values for the associated communication path, such as one or more RSQI, RSSI, or transmit success/fail ratio values. If the communication path represented by a line 306 is bidirectional and a significant difference exists between the statistical values in opposite directions, the label 308 for that line 306 can identify the statistical value for each direction of the communication path. As shown in FIG. 3, the labels 308 identify RSQI values, although other or additional statistical values could be shown in the labels 308.

The graphical display 300 also includes a list 309 of the wireless devices contained within the network map 302. Each device identified in the list 309 could be selected to highlight that device in the network map 302.

If one of the wireless devices in the network map 302 or the list 309 is selected by a user (such as via a mouse, touchscreen, or other input device), a pop-up window 310 can be displayed in proximity to the selected device's icon 304. The pop-up window 310 displays various information about the selected wireless device and its wireless connection(s). In this example, the pop-up window 310 includes the selected wireless device's transmission interval (30 seconds), bandwidth currently used (38%), battery life ("high"), and wireless channels. However, any other or additional information could be presented in the pop-up window 310. A control panel 312 can also be displayed when one of the wireless devices is selected by a user. The control panel 312 includes various controls for configuring the associated wireless device and information about the associated wireless device.

Additional controls can also be provided in the graphical display 300. For example, controls 314 allow a user to navigate up, down, left, and right in the network map 302 and to zoom in and zoom out within the network map 302. Controls 316 allow a user to select different network maps 302 and to control various options of each network map 302. Some of the options accessible via the controls 316 can include creating a new network map 302, editing or deleting an existing network map 302, and controlling which devices are included in a network map 302. Other options accessible via the controls 316 can include controlling an opacity of a network map 302, controlling whether grid lines are displayed in a network map 302, and controlling whether a network map 302 is locked in order to prevent changes to the map. Still other options accessible via the controls 316 can include controlling which statistical values (if any) are shown in the labels 308 of a network map 302 and controlling which communication paths (such as all, none, only routing, or only time synchronization connections) are shown in a network map 302.

Controls 318 provide a wide range of controls related to the network map 302 and to various process control-related functions. Examples of the types of controls 318 that could be used with the network map 302 include filtering the type(s) of device(s) shown in the network map 302. The controls 318 also allow a user to view alarms and reports related to a wireless network.

FIG. 4 illustrates a portion of another network map 402, which could be presented within the graphical display 300. As shown in FIG. 4, the network map 402 includes two icons 404a-404b representing two wireless devices and a line 406 representing a communication path between the devices. The line 406 includes a label 408 with two statistical values (such as two RSQI values). Two pop-up windows 410a-410b are associated with the two icons 404a-404b.

As can be seen in FIG. 4, the two statistical values in the label 408 are significantly different. This is indicative that communications in one direction between two wireless devices are of significantly lower quality than communications in the opposite direction between the two wireless devices. This is indicative of an asymmetric link in the wireless network. The lower RSQI or other value displayed in the label 408 can be used as the overall RSQI or other value for this wireless connection. If the lower RSQI or other value is below a threshold (such as 127), the connection can be flagged, such as by displaying the associated line 406 in red in the network map 402.

Figure 5:
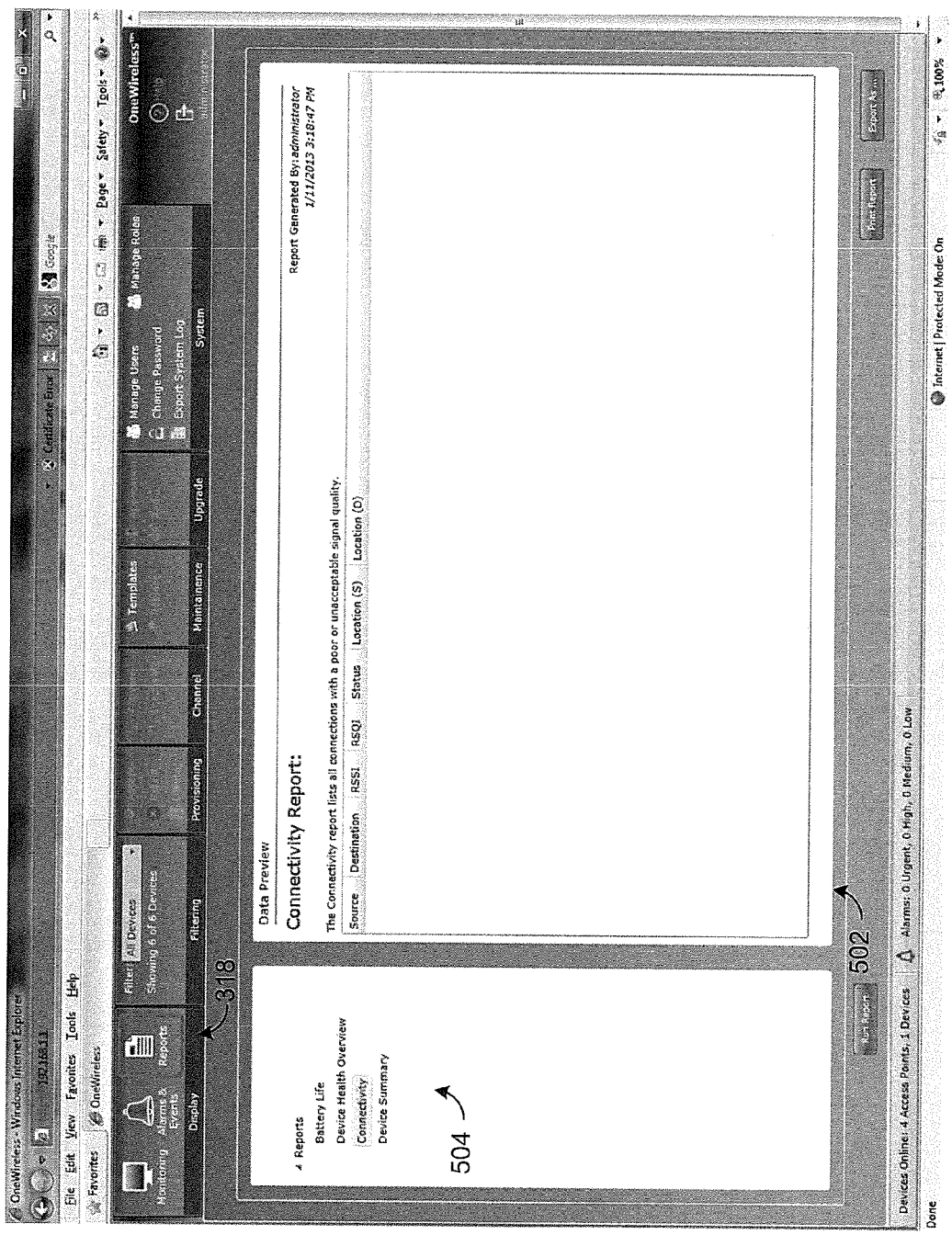
FIG. 5 illustrates an example report for disclosing the reliability of a wireless network according to this disclosure.

FIG. 5 illustrates an example report 502 for disclosing the reliability of a wireless network according to this disclosure. The report 502 here is shown as being accessed through the "Reports" button in the controls 318 of the graphical display 300. However, the report 502 could be accessed in any other suitable manner.

As shown in FIG. 5, the report 502 represents a "Connectivity" report. This report 502 provides a user with detailed information about wireless connections having poor or unacceptable signal quality. For example, the report 502 could identify all wireless connections having an RSQI below a threshold value, such as a value of 127. The report 502 could also identify all asymmetric wireless connections.

For each wireless connection listed in the report 502, the report 502 can identify the source and destination associated with the wireless connection, as well as the RSSI value, the RSQI value, and the status of the wireless connection. The report 502 can also identify the location of the source and the location of the destination associated with the wireless connection.

The report 502 shown in FIG. 5 represents only one of the reports that could be generated for a user. A menu 504 could be used to select different reports. One, some, or all of those reports could include information about asymmetric or other low quality wireless connections or information based on the asymmetric or other low quality wireless connections.

Although FIGS. 3 and 4 illustrate one example of a graphical display 300 for reporting the reliability of a wireless network, various changes may be made to FIGS. 3 and 4. For example, the layout and arrangement of the graphical display 300 are for illustration only. Also, the contents of the pop-up window 310 and the control panel 312 could vary depending on particular needs. Although FIG. 5 illustrates one example of a report 502 for disclosing the reliability of a wireless network, various changes may be made to FIG. 5. For example, the report 502 shown here is for illustration only. The content and arrangement of the report 502 could be varied as desired, and other or additional reports could include information about the reliability of a wireless network.

Asymmetric links can be problematic in various types of networks, such as in industrial automation and control networks. For example, a non-routing field device may not be able to detect an asymmetric link during a discovery process in which the field device attempts to discover neighboring nodes in order to join an industrial wireless network. This is because the non-routing field device may be able to measure the receive signal strength or other quality of a wireless connection only in a downlink direction (router-to-field device) during discovery. The receive signal strength or other quality in an uplink direction (field device-to-router) may not be measured until a connection is actively formed and placed into use. Field devices may therefore not be able to detect asymmetric links before attempting to use wireless connections.

Because of this, a field device may attempt to join a wireless network using an asymmetric wireless connection. If the asymmetric connection is so poor that communication is impossible, the join attempt can fail. The field device may then be required to restart the discovery process and, if other routers are discovered, the field device may attempt to rejoin through a different router.

Moreover, a field device may attempt to activate an asymmetric wireless connection while already connected to the network. This may occur, for example, if the asymmetric connection appears to have a higher quality than the field device's existing link(s). If the field device changes its parent connectivity to redundant links where one link is asymmetric, the field device may detect the asymmetric link and attempt to choose a better parent, and the field device may not drop offline. If the field device changes its parent connectivity to redundant links where both links are asymmetric, it is likely that the field device will drop offline. If the field device changes its parent connectivity to a non-redundant asymmetric link, it is again likely that the field device will drop offline.

The graphical display 300 and report 502 can be used to help maintain or even increase the reliability of the wireless network. For example, if a field device has an asymmetric link, personnel could use the graphical display 300 or the report 502 to identify the asymmetric link and add an access point or field router near the field device. In this case, the field device could then reconfigure its parent connectivity automatically to move away from the asymmetric wireless connection, or this could be done manually by an operator. Personnel could also use the graphical display 300 or the report 502 to identify the asymmetric link and move the field device or repositioning one or more antennas of the field device. In that case, environmental factors at or near the field device could be creating the asymmetric link, and moving the field device or changing the positioning of its antenna(s) could help to resolve the problem.

Operators could also use the graphical display 300 or report 502 to verify that one or more thresholds are configured to one or more suitable values. For example, a "link quality threshold" parameter can be used to define the minimum RSQI or other value permitted for wireless connections. If the "link quality threshold" is increased to a higher value, the system may prevent field devices from changing parent connectivity to other connections or otherwise using connections with RSQI or other values below the "link quality threshold." However, caution can be taken when adjusting the "link quality threshold." A field device may join a network through a wireless connection with a signal strength below the "link quality threshold" but then change its parent connectivity after joining (if other connections are available with signal strengths above the "link quality threshold"). If the system prevents field devices from changing parent connectivity to other connections with acceptable RSQI or other values, field devices may be stuck on asymmetric join connections.

Note that the identity of an asymmetric or other low quality link could be used in any other suitable manner. For example, a system could automatically "blacklist" asymmetric or other low quality connections, meaning those connections are not selected by the system for use in routing data between nodes in the wireless network. The system could also reduce or minimize the number of parent connectivity changes that a wireless node can perform, which can help to reduce the possibility of the wireless node unknowingly selecting an asymmetric link for communication with a parent node.

There are various other areas in which the behavior of an industrial network (such as an ISA100.11a network) can be improved in the presence of asymmetric or other low quality links. Example areas include (i) the incorporation of transmit failure rate significant change detection into model decisions and (ii) the reduction/prevention of parent changes in the wireless network.

With respect to the first example, significant change detection refers to a process where a wireless connection is examined to determine whether the wireless connection has experienced a significant change (typically a significant degradation) in its operational characteristics. When this occurs, a system manager (SM) model used to manage a wireless network can be updated. In some embodiments, upon the periodic receipt of a health reports concentrator object (HRCO) neighbor diagnostic publication or other message, the model can be used to detect significant changes in transmit failures. Given that the rate of communication varies, such as due to the publication period and the current request/response traffic, significant change detection might not be attempted until a minimum number of total transmissions are accumulated (such as 24). The minimum number could include successful transmissions, failed transmissions (negative ACK), and transmissions without a successful acknowledged (no ACK) (Clear Channel Assessment or "CCA" backoff messages could be excluded). Once the total threshold is satisfied, the transmit failure ratio can be computed as the ratio of negative ACK and no ACK transmissions to the total number of transmissions. The accumulated samples can then be reset and accumulated for the next significant change detection attempt. A significant change can be detected for a transmit failure ratio above a specified percentage, such as 50% (although this threshold could be adjusted as needed or desired).

The transmit failure ratio may be different than a downlink (DL) connectivity alert, which may be reported by a device if it transmits a specified number of packets (such as 10 packets minimum) within a specified time (such as 1 minute) with a specified failure rate (such as 90% or greater). The SM model can accumulate transmit failures irrespective of the time period, which means that the SM model can detect a significant transmit failure rate when a communication link does not have frequent communication attempts. However, a transmit failure rate significant change may be treated the same as a DL connectivity alert, such as by removing the wireless connection (via a "blacklist" flag) unless that wireless connection is the only connection to one or more devices.

With respect to the second example, in some implementations, nodes in a wireless network are arranged in a hierarchical configuration, where each node in one level communicates with one or more nodes in a higher level (if a higher level exists). The nodes in the higher level represent the "parent" nodes of "child" nodes in the lower level. A "parent change" refers to an operation in which a child node in a lower level changes one or more of its parent nodes, and the new parent node or nodes need not be in the same level(s) as the old parent node(s). FIGS. 6A through 6E illustrate example changes to parent nodes in a wireless network according to this disclosure.

In some embodiments, a "parent change" operation can be triggered by various SM model actions, even though the "parent change" operation may or may not result in the selection of new parent nodes. Example model actions can include the following.

"Add Edge" creation due to node join or re-join: Identifies the endpoint nodes of an edge (communication path) for parent re-evaluation.

"Add Edge" creation due to initial neighbor candidate update (resulting in dormant to inactive transition): Identifies an edge's endpoint nodes for parent re-evaluation. A fixed radius search can be performed to identify any non-redundant peer/children neighbors that would also benefit from the edge addition.

RSQI (or other) significant change due to (active edge) neighbor diagnostic update, (inactive edge) neighbor candidate update, or setting initial RSQI (or other) following node join: Identifies an edge's endpoint nodes for parent re-evaluation.

Access Point (AP) removal: Identifies all nodes that refer to the AP in their main route or alternate route for parent re-evaluation.

Route level change due to edge addition or removal: Identifies affected children with route level change for parent re-evaluation.

Remove edge: Identifies an edge's endpoint nodes for parent re-evaluation.

Change in node energy type: Identifies the node and all active neighbors affected by a group change for parent re-evaluation. This may occur, for example, if a field device initially and unintentionally reports itself as being line-powered but later indicates that it is battery-powered (or vice versa). This trigger is used to adjust communication resource allocations based on the new energy type.

When a specified node is to perform the "parent change" operation, the specified node can select various neighbor nodes as potential candidates for its parent node(s). In some embodiments, a neighbor node may be a valid parent candidate if it does not fail any of the following validation criteria.

The neighbor edge is either already active, or the specified and neighbor nodes can support an additional neighbor for edge activation.

The neighbor node has the same or lower route level than the specified node.

The neighbor node is an access point or router (as non-router nodes may not be parents).

The neighbor node does not have the specified node as its route parent.

The neighbor node is not at the maximum route depth.

The neighbor node is not already selected as the primary parent of the specified node (done during a secondary pass for parent nodes).

The neighbor node either (i) is the previous route parent or (ii) has link and slot availability for Guaranteed Leaf Access (GLA) communications.

The neighbor node has a route to an alternate access point (done during a secondary pass for parent nodes).

Figure 6A:
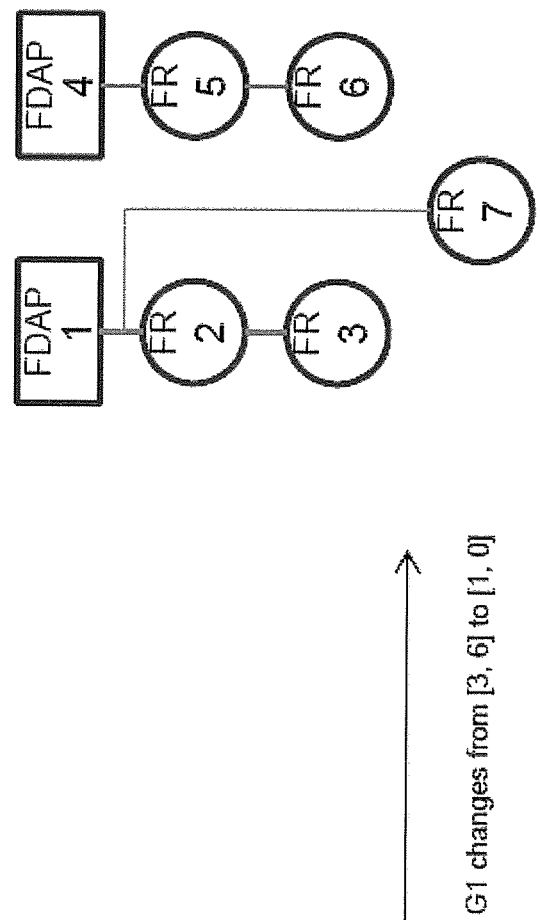
FIGS. 6A through 6E illustrate example changes to parent nodes in a wireless network according to this disclosure.
Figure 6A:
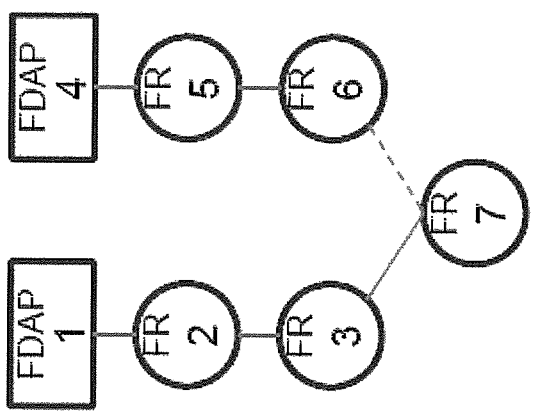
Figure 6B:
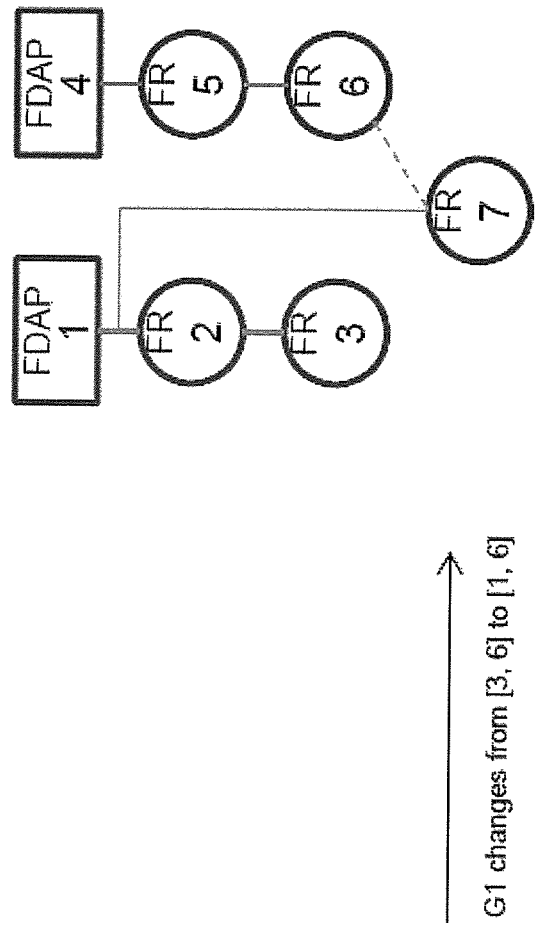
Figure 6B:
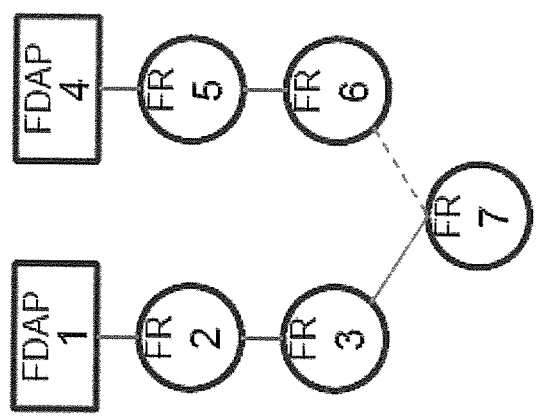

The second criterion above could be omitted to allow the original secondary parent to persist after the primary parent changes its route level (by more than one). For instance, consider Field Router FR7 in FIG. 6A. If the second criterion above is enforced, a primary parent change from level 3 to level 1 would result in the original secondary parent being declared invalid. As a result, Field Router FR7 would only have a single parent and would need to identify a new secondary parent. As shown in FIG. 6B, if the second criterion above is removed, a primary parent change from level 3 to level 1 would allow the original secondary parent to persist after the primary parent change.

In some embodiments, the SM model performs parent selection in two passes, one for the primary parent and one for the secondary parent. During each pass, the SM model can perform parent selection by searching all of a specified node's neighbors for valid parent candidates and then selecting the best candidate. The neighbors could be grouped into neighbors without blacklisted edges and neighbors with blacklisted edges. The parent selection may first try to find a candidate neighbor without a blacklisted edge and, if none are found, the neighbors with blacklisted edges can be searched. Once one or more valid parent candidates are identified, a route weight to a backbone router can be computed for each candidate. Irrespective of whether computing primary or secondary route weights, it can be computed as the sum of the weights to the new parent and the sum of the weights for the remaining primary edges to reach a backbone router.

The list of neighbor candidates can be reduced to two semi-finalists, such as the previous route parent (if found) and the neighbor with the lowest route weight. If only one semi-finalist candidate exists, it is the automatic winner and can be selected as the route parent. Otherwise, if the previous route parent and a new route parent candidate exist, the bias may be to reuse the previous route parent with the following restrictions:

If the primary parent has changed, the secondary parent can be set to the previous route parent in order to minimize the risk of selecting two new parents and having communication difficulties with both.

Otherwise, the new route parent candidate can be selected if its weight is lower than the previous route parent's weight plus a weight deadband (such as a value of 20).

Steps can be taken to reduce the chance of changing more than one parent at a time.

The route weight computation may be designed to give preference to line-powered routers over battery powered-routers and to give preference to shorter routes over longer routes (to the backbone). This allows for convergence to a flat network with minimum battery router usage. However, the route weight can vary between two routers with the same energy type and route level, resulting in unnecessary parent changes. As a result, the SM model can add a neighbor validation criterion to identify a neighbor as a potential parent candidate only if it improves route level or energy type as compared to the original parent. This new validation criterion may only be applicable if the original parent exists as a candidate (the SM model can change to search for the original parent first). In other words, this new validation criterion can be disabled upon removal of the original parent node/edge. The SM model may continue to select the new route parent candidate if its weight is lower than the previous route parent's weight plus the weight deadband, but the list of new parent candidates can be restricted to candidates with energy type or route level improvements.

Figure 6C:
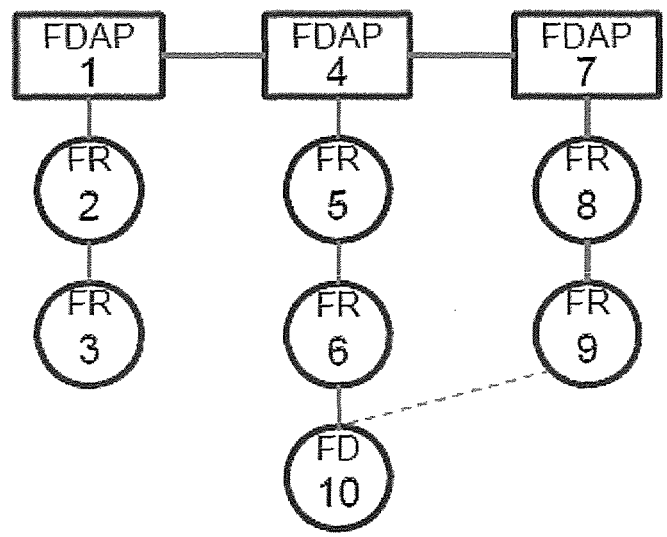

Consider the example shown in FIG. 6C. Field Device FD10 joins a wireless network through Field Router FR6 with a connection having an RSQI value of 230 in both directions. Field Device FD10 then discovers neighbor candidates Field Router FR3 with an RSQI value of 220 and Field Router FR9 with an RSQI value of 190. Field Device FD10 chooses Field Router FR3 as its secondary parent but then discovers that this link is severely asymmetric. Field Device FD10 may not change its secondary parent until the link between FR3 and FD10 is removed, such as due to a DL connectivity alert or a transmit failure rate significant change detection (both of which can result in edge removal). Once that edge is removed, Field Device FD10 can select Field Router FR9 as its new secondary parent.

Note that it may take an extended period of time (such as one or several minutes) to reconfigure a specified node following a parent change. Ideally, any future parent change can be delayed until the specified node is re-configured for the previous parent change and the specified node has had some time to use the new parent (such as to find out if the link to the new parent node is asymmetric). A "Change Delay" counter can be added to each node instance in the SM model database so that:

The "Change Delay" counter is set to zero when disabled and initialized with a delay value upon changing a parent. An example delay value of five minutes might allow 2.5 minutes for reconfiguration and 2.5 minutes of neighbor diagnostic collection.

When performing parent selection, the original parent may automatically win when the "Change Delay" counter is enabled.

The removal of the original parent node or edge can result in selection of a new parent irrespective of whether the "Change Delay" counter is enabled or disabled (because the original parent is no longer found).

The "Change Delay" transition from enabled to disabled may act as a new parent change trigger to compensate for any missed parent change triggers ignored during the delay.

Note that this can introduce periodic execution of the SM model.

The "Change Delay" counter can be reused to detect when an intermediate node in the primary route to a backbone router is having its primary parent reconfigured. Parent reconfiguration has a non-trivial risk of incurring transient communication interruptions. There are two separate scenarios to consider:

Changing a node's parent when intermediate nodes in the original route are being modified.

Selecting a neighbor whose primary route is being modified as a parent candidate.

Figure 6D:
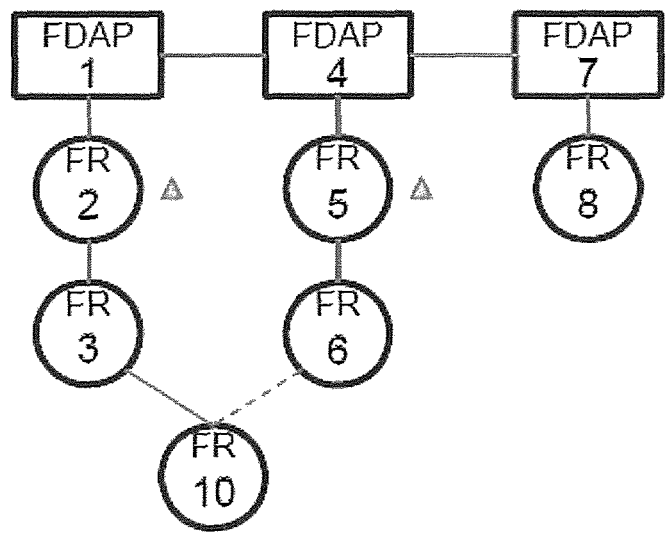
Figure 6E:
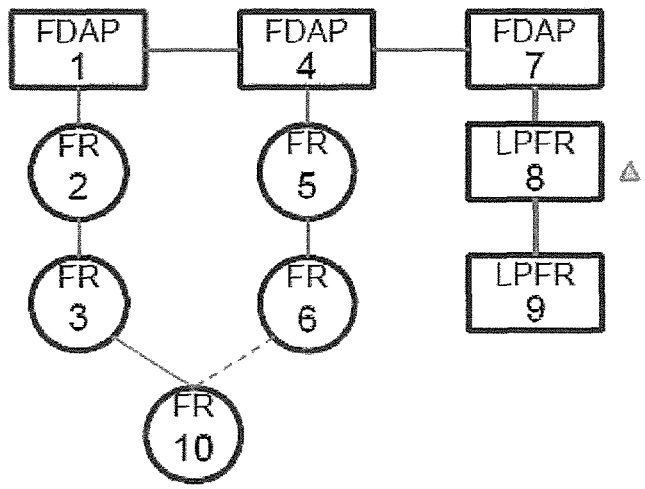

FIG. 6D relates to the first scenario, where Field Router FR10 discovers an inactive edge with Field Router FR8. However, Field Router FR10 should not change its parents because both of its current routes have intermediate nodes being reconfigured. FIG. 6E relates to the second scenario, where Field Router FR10 discovers an inactive edge with Line-Power Field Router LPFR9. However, Field Router FR10 should not change its parents because the LPFR9 route to a backbone router has intermediate nodes being reconfigured.

In light of this, the SM model may not attempt a parent change for a specified node if both routes from the specified node to its backbone router have nodes with the "Change Delay" counter enabled (for their primary parents). Also, the SM model may add a neighbor validation criterion to only identify a neighbor as a new parent candidate if its primary route to a backbone router has all nodes with the "Change Delay" counter disabled (for their primary parents). These may only be applicable if both the original primary and secondary parents exist as candidates. This enforces a design specification that restoring communication redundancy is more important than minimizing parent changes (although this need not be the case).

Figure 7:
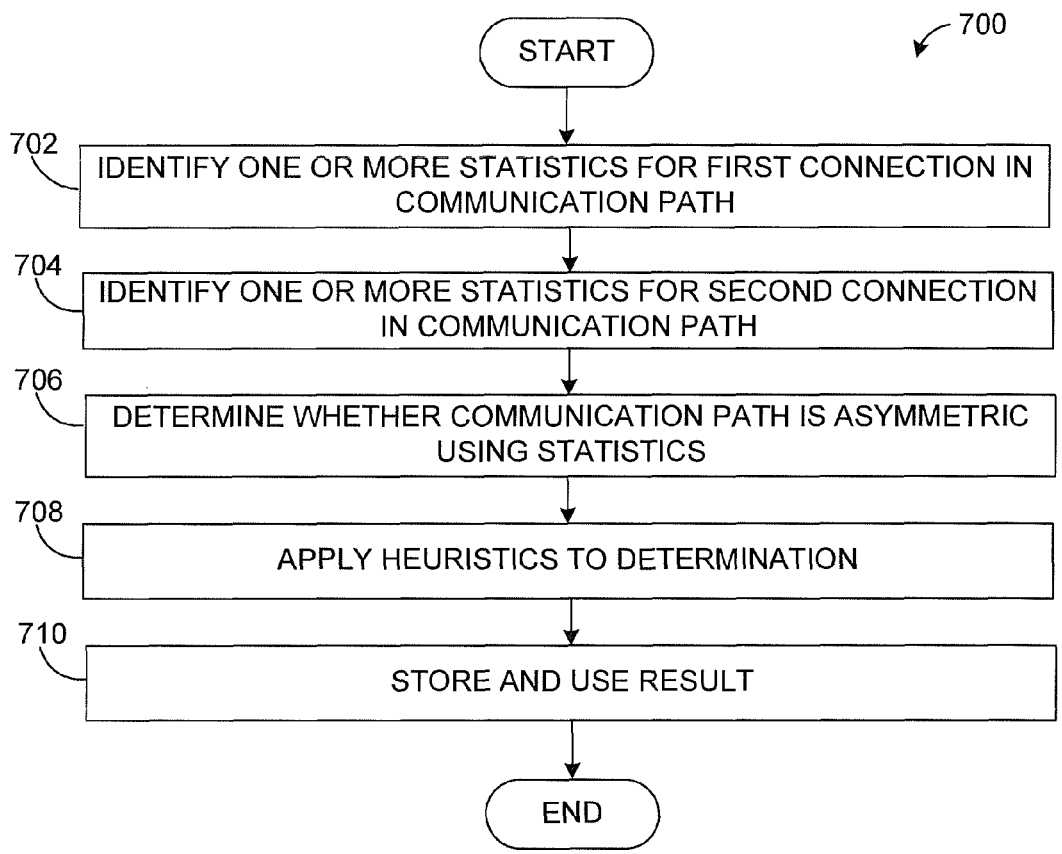
FIG. 7 illustrates an example method for maintaining the reliability of a wireless network having asymmetric or other low quality links according to this disclosure.

Note that each wireless node can be given a collection of node IDs that require parent evaluation after that node completes its "Change Delay" period. The search identifying that a node in an existing or future route has a "Change Delay" counter enabled can also add the searching node ID to the collection of nodes requiring parent evaluation after the intermediate nodes complete their re-configuration FIG. 7 illustrates an example method 700 for maintaining the reliability of a wireless network having asymmetric or other low quality links according to this disclosure. As shown in FIG. 7, one or more statistics for a first connection in a communication path are identified at step 702, and one or more statistics for a second connection in the communication path are identified at step 704. This could include, for example, a network management algorithm supported by the system manager 124 collecting or calculating RSQI, RSSI, or transmit success/fail ratio values for multiple connections between two network nodes. The system manager 124 could receive the statistics from one or more other devices, or the system manager 124 could calculate the statistics itself.

A determination is made whether the communication path is asymmetric at step 706. This could include, for example, the system manager 124 determining whether the statistic(s) in one direction of the communication path differ from the statistic(s) in the other direction of the communication path by a threshold amount or percentage. One or more heuristics are applied to the determination at step 708. This could include, for example, the system manager 124 determining whether the statistics for both directions of the communication path are above a second threshold, indicating that the communication path has high quality even in the presence of some asymmetry.

The result is used in some manner at step 710. The specific use depends on the application. For example, the result can be included in the graphical display 300 or in a report 502. The system manager 124 could also use the result to select communication paths used by devices in the wireless network or to reroute wireless traffic around asymmetric communication paths. The system manager 124 could also use the result to control parent selection for nodes in the wireless network. The result could be used in any other suitable manner.

Although FIG. 7 illustrates one example of a method 700 for maintaining the reliability of a wireless network having asymmetric or other low quality links, various changes may be made to FIG. 7. For example, while shown as a series of steps, various steps in FIG. 7 could overlap, occur in parallel, occur in a different order, or occur any number of times. Also, while described as involving the identification of asymmetric links, the method 700 could involve the identification of other low quality links.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The term "couple" and its derivatives refer to any direct or indirect communication between two or more elements, whether or not those elements are in physical contact with one another. The terms "application" and "program" refer to one or more computer programs, software components, sets of instructions, procedures, functions, objects, classes, instances, related data, or a portion thereof adapted for implementation in a suitable computer code (including source code, object code, or executable code). The terms "receive" and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:

receiving link quality information associated with multiple wireless connections in a wireless network; and identifying at least one asymmetric communication path in the wireless network using the link quality information;

wherein the multiple wireless connections include a first unidirectional wireless connection from a first wireless device to a second wireless device and a second unidirectional wireless connection from the second wireless device to the first wireless device;

wherein the link quality information includes first and second statistical values associated with the first and second unidirectional wireless connections, respectively;

wherein the first and second unidirectional wireless connections between the first and second wireless devices are identified as forming an asymmetric communication path when a difference between the first and second statistical values exceeds a first threshold and at least one of the first and second statistical values does not exceed a second threshold; and wherein the first and second unidirectional wireless connections between the first and second wireless devices are identified as not forming an asymmetric communication path when both the first and second statistical values exceed the second threshold even if the difference between the first and second statistical values exceeds the first threshold.

2. The method of claim 1, wherein the statistical values comprise at least one of: Received Signal Quality Indicator (RSQI) values, Received Signal Strength Indication (RSSI) values, and transmit success/fail ratio values.

3. The method of claim 1, wherein a heuristic is applied to identify when the first and second wireless connections do not form an asymmetric communication path when both the first and second statistical values exceed the second threshold even if the difference between the first and second statistical values exceeds the first threshold.

4. The method of claim 1, further comprising:

generating a graphical display, the graphical display comprising a network map identifying multiple wireless devices and multiple communication paths between the wireless devices, the network map providing an indication identifying the at least one asymmetric communication path in the wireless network.

5. The method of claim 1, further comprising:

generating a report comprising an identification of the at least one asymmetric communication path in the wireless network.

6. The method of claim 1, further comprising at least one of:

blocking a usage of the at least one asymmetric communication path; and delaying the usage of the at least one asymmetric communication path.

7. An apparatus comprising:

an interface configured to receive link quality information associated with multiple wireless connections in a wireless network; and at least one processing device configured to identify at least one asymmetric communication path in the wireless network using the link quality information;

wherein the multiple wireless connections include a first unidirectional wireless connection from a first wireless device to a second wireless device and a second unidirectional wireless connection from the second wireless device to the first wireless device;

wherein the link quality information includes first and second statistical values associated with the first and second unidirectional wireless connections, respectively;

wherein the at least one processing device is configured to identify the first and second unidirectional wireless connections between the first and second wireless devices as forming an asymmetric communication path when a difference between the first and second statistical values exceeds a first threshold and at least one of the first and second statistical values does not exceed a second threshold; and wherein the at least one processing device is configured to identify the first and second unidirectional wireless connections between the first and second wireless devices as not forming an asymmetric communication path when both the first and second statistical values exceed the second threshold even if the difference between the first and second statistical values exceeds the first threshold.

8. The apparatus of claim 7, wherein the statistical values comprise at least one of: Received Signal Quality Indicator (RSQI) values, Received Signal Strength Indication (RSSI) values, and transmit success/fail ratio values.

9. The apparatus of claim 7, wherein the first threshold comprises at least one of: a threshold amount and a threshold percentage.

10. The apparatus of claim 7, wherein the at least one processing device is further configured to generate a graphical display, the graphical display comprising a network map identifying multiple wireless devices and multiple communication paths between the wireless devices, the network map configured to provide an indication identifying the at least one asymmetric communication path in the wireless network.

11. The apparatus of claim 7, wherein the at least one processing device is further configured to generate a report comprising an identification of the at least one asymmetric communication path in the wireless network.

12. The apparatus of claim 7, wherein the at least one processing device is further configured to at least one of:

block a usage of the at least one asymmetric communication path; and delay the usage of the at least one asymmetric communication path.

13. A non-transitory computer readable medium embodying a computer program, the computer program comprising computer readable program code for:

obtaining link quality information associated with multiple wireless connections in a wireless network; and identifying at least one asymmetric communication path in the wireless network using the link quality information;

wherein the multiple wireless connections include a first unidirectional wireless connection from a first wireless device to a second wireless device and a second unidirectional wireless connection from the second wireless device to the first wireless device;

wherein the link quality information includes first and second statistical values associated with the first and second unidirectional wireless connections, respectively;

wherein the first and second unidirectional wireless connections between the first and second wireless devices are identified as forming an asymmetric communication path when a difference between the first and second statistical values exceeds a first threshold and at least one of the first and second statistical values does not exceed a second threshold; and wherein the first and second unidirectional wireless connections between the first and second wireless devices are identified as not forming an asymmetric communication path when both the first and second statistical values exceed the second threshold even if the difference between the first and second statistical values exceeds the first threshold.

14. The non-transitory computer readable medium of claim 13, wherein the computer program further comprises computer readable program code for at least one of:

blocking a usage of the at least one asymmetric communication path; and delaying the usage of the at least one asymmetric communication path.

15. The non-transitory computer readable medium of claim 13, wherein the statistical values comprise at least one of: Received Signal Quality Indicator (RSQI) values, Received Signal Strength Indication (RSSI) values, and transmit success/fail ratio values.

16. The non-transitory computer readable medium of claim 13, wherein the computer program further comprises computer readable program code for:

applying a heuristic to identify when the first and second wireless connections do not form an asymmetric communication path when both the first and second statistical values exceed the second threshold even if the difference between the first and second statistical values exceeds the first threshold.

17. The non-transitory computer readable medium of claim 13, wherein the computer program further comprises computer readable program code for:

generating a graphical display, the graphical display comprising a network map identifying multiple wireless devices and multiple communication paths between the wireless devices, the network map providing an indication identifying the at least one asymmetric communication path in the wireless network.

18. The non-transitory computer readable medium of claim 13, wherein the computer program further comprises computer readable program code for:

generating a report comprising an identification of the at least one asymmetric communication path in the wireless network.

19. The method of claim 1, wherein:

the wireless network comprises multiple wireless devices including the first and second wireless devices; and the multiple wireless devices are arranged hierarchically in multiple levels within the wireless network such that each wireless device in each level except a topmost level communicates with one or more parent wireless devices in a higher level, each wireless device configured to perform a parent change operation in which the wireless device identifies its one or more parent wireless devices.

20. The method of claim 19, further comprising:

performing network management using an identification of the at least one asymmetric communication path in the wireless network, wherein use of the identification of the at least one asymmetric communication path reduces a number of parent change operations in the wireless network.

* * * * *